(12) United States Patent
Zeng

(10) Patent No.: US 12,166,747 B2
(45) Date of Patent: Dec. 10, 2024

(54) MANAGEMENT OF SECRET INFORMATION

(71) Applicant: Lemon Inc., Grand Cayman (KY)

(72) Inventor: Jun Zeng, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 262 days.

(21) Appl. No.: 17/828,925

(22) Filed: May 31, 2022

(65) Prior Publication Data

US 2023/0388286 A1 Nov. 30, 2023

(51) Int. Cl.
*H04L 9/40* (2022.01)
*H04L 9/06* (2006.01)
*H04L 9/08* (2006.01)
*H04L 9/32* (2006.01)

(52) U.S. Cl.
CPC .......... *H04L 63/0815* (2013.01); *H04L 9/085* (2013.01); *H04L 9/088* (2013.01); *H04L 63/06* (2013.01); *H04L 63/166* (2013.01)

(58) Field of Classification Search
CPC ..... H04L 63/0815; H04L 9/085; H04L 9/088; H04L 63/06; H04L 63/166; H04L 9/0631; H04L 9/083; H04L 9/0891; H04L 9/0894; H04L 9/3213
See application file for complete search history.

(56) References Cited

U.S. PATENT DOCUMENTS

| | | | | |
|---|---|---|---|---|
| 10,007,809 B1* | 6/2018 | Douglis | .................. | H04L 9/0894 |
| 10,467,422 B1* | 11/2019 | Roth | ...................... | G06F 21/602 |
| 10,673,862 B1* | 6/2020 | Threlkeld | ................ | G06F 21/62 |
| 10,958,662 B1* | 3/2021 | Sole | ...................... | H04L 63/0853 |
| 10,963,589 B1* | 3/2021 | Fakhraie | ................ | H04L 63/101 |
| 11,947,708 B2* | 4/2024 | Brannon | ............... | G06F 21/6263 |
| 2002/0071564 A1* | 6/2002 | Kurn | ........................ | H04L 63/08 380/281 |
| 2009/0175453 A1* | 7/2009 | Shinbori | ............... | H04L 9/0891 380/277 |
| 2010/0306530 A1* | 12/2010 | Johnson | .............. | G06F 21/6218 380/282 |
| 2011/0113488 A1* | 5/2011 | Schultz | ................ | G06F 21/6245 715/764 |
| 2015/0332029 A1* | 11/2015 | Coxe | ........................ | G06F 21/31 726/5 |
| 2017/0250816 A1* | 8/2017 | Popa | ......................... | G06F 21/62 |
| 2017/0331802 A1* | 11/2017 | Keshava | ................ | H04L 9/0894 |
| 2018/0096164 A1* | 4/2018 | Dageville | ............. | G06F 21/602 |
| 2019/0124070 A1* | 4/2019 | Engan | ..................... | H04L 9/3247 |
| 2019/0163896 A1* | 5/2019 | Balaraman | .............. | G06F 21/41 |
| 2019/0342281 A1* | 11/2019 | Shaw | ...................... | H04L 43/10 |
| 2019/0372962 A1* | 12/2019 | Maria | ...................... | G06F 21/41 |
| 2021/0126910 A1* | 4/2021 | Chauhan | ............. | H04L 63/0428 |
| 2023/0164124 A1* | 5/2023 | Maher | .................... | H04L 63/102 726/4 |

* cited by examiner

*Primary Examiner* — Darren B Schwartz
(74) *Attorney, Agent, or Firm* — BakerHostetler

(57) ABSTRACT

The present disclosure describes techniques for managing secret information. A material set may be created. The material set may correspond to a material set name (MSN). The material set may be configured to contain secret information and information for identifying destinations that are authorized to access the secret information. The secret information may be managed by using the MSN to identify and track the secret information and without exposing the secret information.

16 Claims, 16 Drawing Sheets

1500

Periodically rotate the secret information when the secret information comprises a symmetric secret, wherein a new symmetric secret is periodically generated by a secret management service to replace an old symmetric secret, wherein the secret management service provides a secure storage and retrieval service for the secret information 1502

Implement a smooth rotation by enabling to retrieve both the new symmetric secret and the old symmetric secret during a rotation duration 1504

MANAGEMENT OF SECRET INFORMATION

BACKGROUND

Certain data may be sensitive or confidential. Permission to such data may be restricted to a particular set of parties. For example, sensitive or confidential data may be encrypted so that only authorized parties can access it. As the quantity of sensitive or confidential data continues to increase, people continue to desire new ways for managing access to data.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
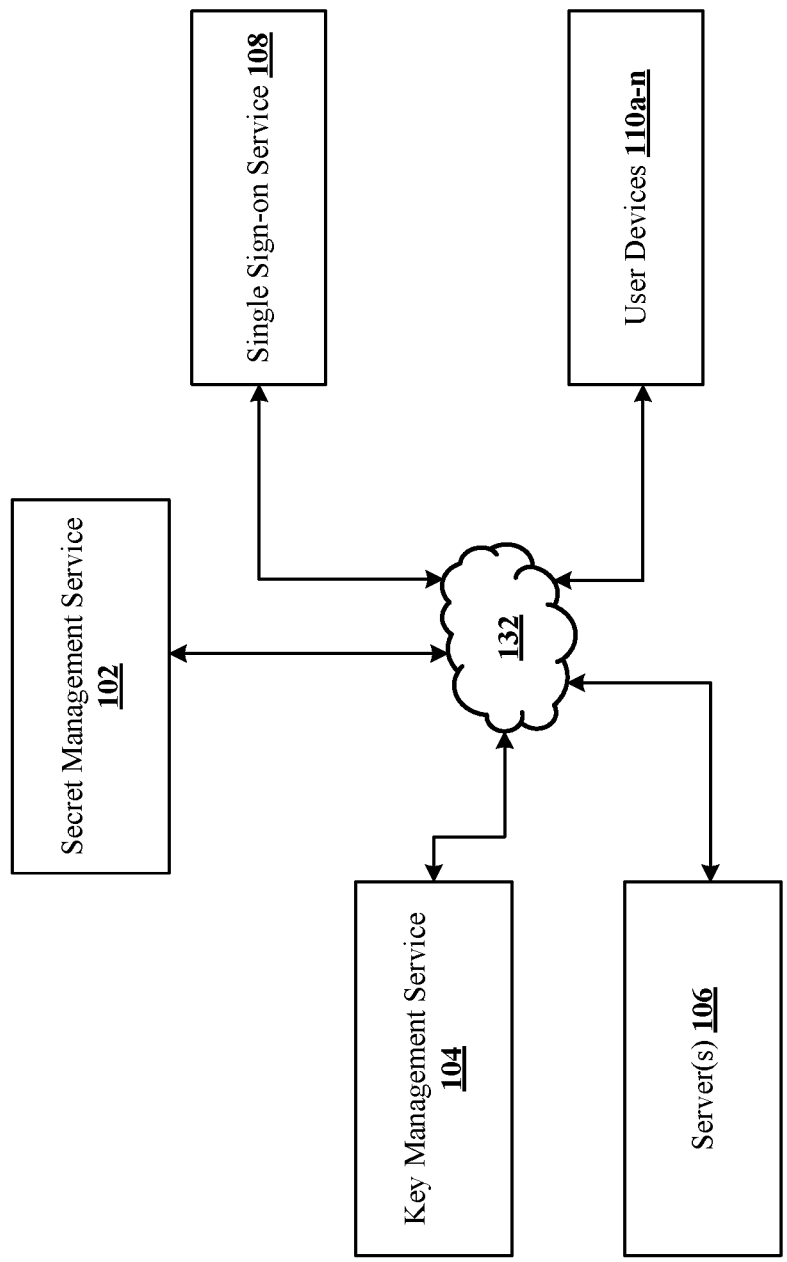
FIG. 1 shows an example system for managing secret information in accordance with the present disclosure.

Data that is sensitive or confidential (herein after referred to as "secrets") may be hard coded in code repositories and documents for usage. Such secrets may, for example, be typed as plaintext (e.g., in a form that can be seen or utilized without the need for a decryption key or decryption device) in a public or private chat room to be shared for issue debugging. For example, such secrets may be typed as plaintext in a public or private chat room to be shared for debugging the basic authentication for making a Hypertext Transfer Protocol (HTTP) call, or any other usage scenarios.

Hard-coded secrets may cause the isolation of code-sharing across teams within a company and may partially reduce the efficiency and transparency of knowledge sharing. The security level of these repositories or documents may be set higher than it should be in order to block access to the secrets to others inside a company. This may in turn decrease cooperation across the whole company, may cause each team to do similar and/or duplicated work, or may cause each team to spend extra time and effort on communicating with the other team(s). Additionally, many hard-coded secrets may be stored inside a device (e.g., laptop, mobile device, etc.) and the code may be pulled down through git commands. Such secrets may be kept in the device even if the owner moves to another team. Additionally, malicious integrated development environment (IDE) plugins or tools on the device(s) may leak the codes—therefore leaking the secrets contained inside the code.

Additionally, if plaintext secrets are shared in a public or private chat, such secrets may be easily leaked. There is no way to audit which participants in the chat saved and used the secrets. Thus, it is impossible to determine who has the ability to leverage a secret to do something malicious. This may then require the service itself to do extra work to detect the secret leak. Additionally, every participant in the chat, including those the secret should not be shared with, is able to see and use such a plaintext secret to do something beyond their scope. An attacker may be able to probe for more permissions by using the secrets to get more access to other resources. This may cause serious security issues.

A key management system (KMS) may be used to manage encryption and decryption keys for secret encryption and decryption. However, few people or teams adopt the KMS, as it has many downsides. First, the KMS is not easy to use. For users to use KMS to handle secret management, the users may first need to learn extra domain terms and/or other KMS knowledge. Second, users may need to setup their own storage to store the ciphertext (e.g., encrypted text transformed from plaintext using an encryption algorithm) for further usage. Thus, improved techniques for secret management are desirable.

Described herein are improved techniques for secret management. Such techniques may utilize a secret management service to eliminate the exposure of secrets to internal users across different service platforms. The secret management service described herein may have a simpler onboarding process compared to other secret management solutions (e.g., KSM). The secret management service described herein may facilitate the auditing of secrets. Additionally, the secret management service described herein may facilitate secret rotation.

FIG. 1 illustrates an example system 100 for secret management. The system 100 may comprise a secret management service 102, a key management service 104, one or more server(s) 106, a single sign-on service 108, and a plurality of client devices 110a-n. The secret management service 102, the key management service 104, one or more server(s) 106, single sign-on service 108, and plurality of client devices 110a-n may communicate with each other via one or more networks 132.

The network(s) 132 comprise a variety of network devices, such as routers, switches, multiplexers, hubs, modems, bridges, repeaters, firewalls, proxy devices, and/or the like. The network(s) 132 may comprise physical links, such as coaxial cable links, twisted pair cable links, fiber optic links, a combination thereof, and/or the like. The network(s) 132 may comprise wireless links, such as cellular links, satellite links, Wi-Fi links and/or the like.

The plurality of client devices 110 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 110 may be associated with one or more users. The one or more users associated with each of the plurality of client devices 110 may, for example, be users of a secret management service 102. The secret management service 102 may provide a secure storage and retrieval service for the secret information.

Figure 6:
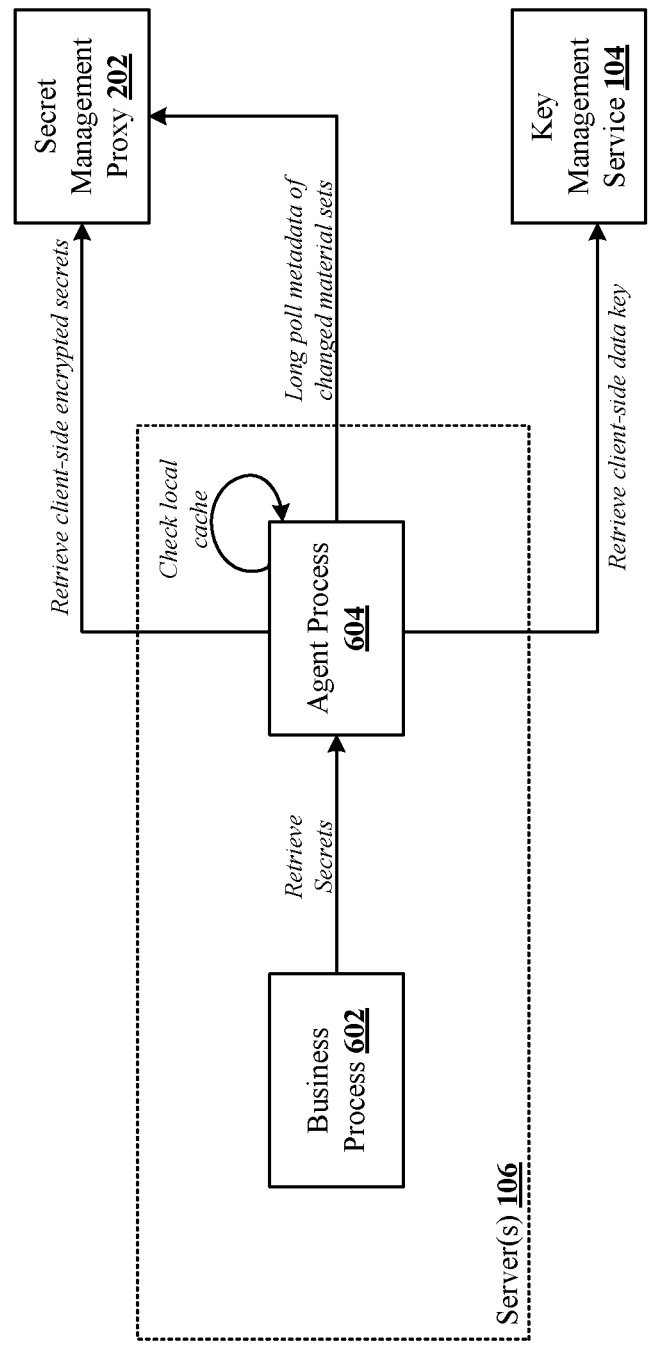
FIG. 6 shows another example architecture in accordance with the present disclosure.
Figure 7:
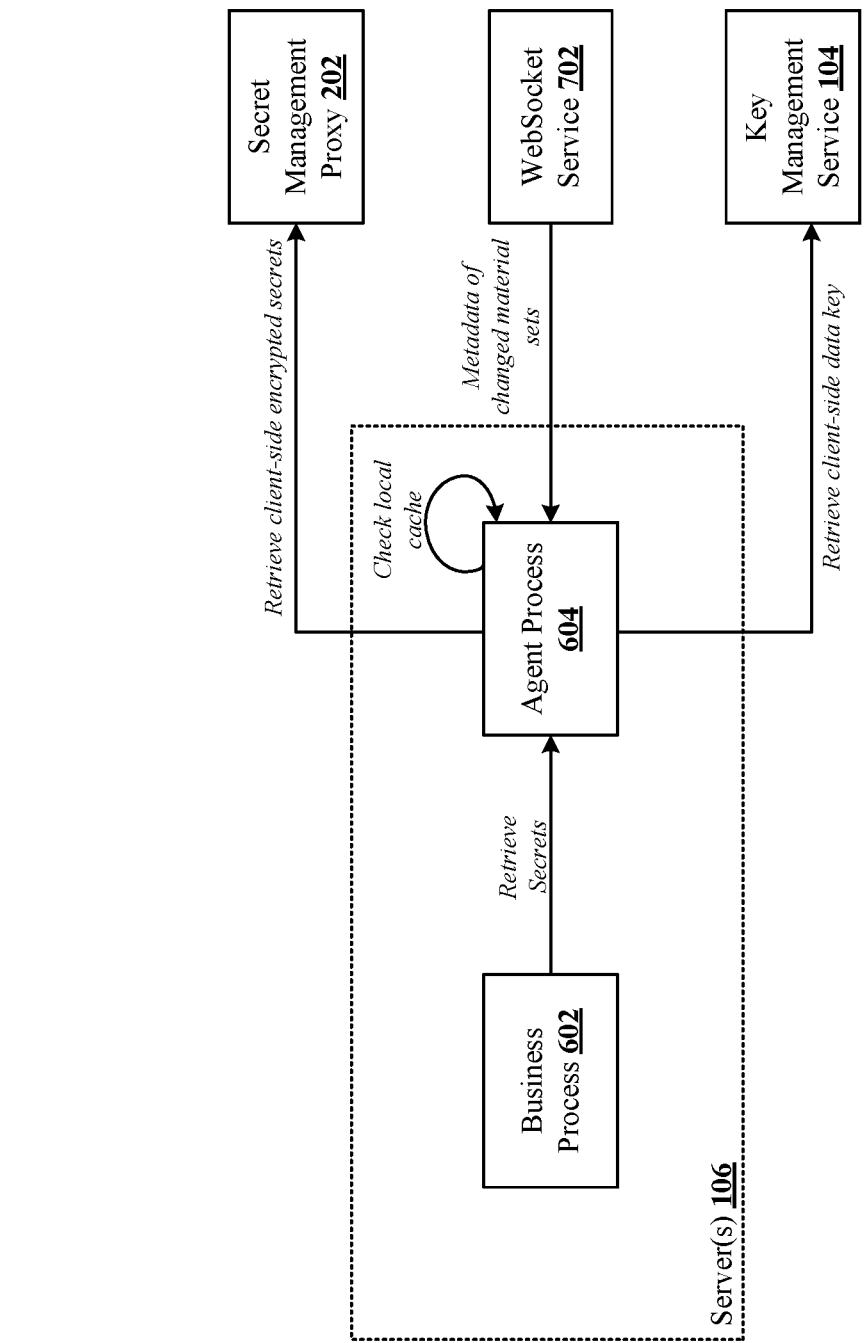
FIG. 7 shows another example architecture in accordance with the present disclosure.

In embodiments, the secret management service 102 comprises one or more components that may be implemented as software, hardware, or a combination of both using one or more multiple computing devices located at server(s) 106 and/or the plurality of client devices 110. By leveraging a distributed service architecture, the secret management service 102 may achieve higher service level agreement (SLA) and in-time secret updates at the same time. FIGS. 2-5, discussed below in more detail, show example server-side architectures for the secret management service 102. FIGS. 6-7, discussed below in more detail, show example client-side architectures for the secret management service 102.

The secret management service 102 may be configured to handle client-side secret encryption and decryption without being perceived by the users. For example, the secret management service 102 may utilize the key management service 104 to encrypt and decrypt secrets. The secret management service 102 may be configured to eliminate unauthorized exposure to secrets. The secret management service 102 may support any type of secret, including but not limited to tokens, key pairs, binary and blob text.

In embodiments, the secret management service 102 may utilize a material set that plays the role of a reference key. The reference key may pass secrets across different applications and platforms. Instead of displaying secrets on a user interface and letting users copy, paste, and configure them, only the material set name with proper ownership setup will be displayed by utilizing the techniques described in the present disclosure. Users of the secret management service 102 just need to add privileged session managers (PSMs) into the destination section, then the secrets may be retrieved and used in the bootstrapping stage and runtime.

In embodiments, each material set will have its own data key associated with the key management service 104 for end-to-end secret encryption and/or decryption. A material set may be the basic unit to hold secrets. Each material set may contain a list of one or more secrets, including all the historical versions of each secret in the list. For example, a material set may include up to twenty historical versions of each secret in a list. However, only one of these versions will be set to be active and able to be retrieved. Each material set may contain a list of destination these secrets are allowed to be retrieved from. Each material set may be allowed to store one of the following types of secrets: username and password, public key and private key, secret string (e.g., AES key, token), or any other type of secret.

In embodiments, each material set corresponds to a material set name. Secrets may be identified and tracked by material set name. Each material set name may be expressed in a URL Format of one level URI, to be hierarchical for the management of namespaces and material sets.

In embodiments, each material set may belong to or be associated with a namespace. A namespace associated with a particular material set may be the domain of the URL associated with that particular material set name. Users of the secret management service 102 can create their own namespaces for their specific services or purposes in order to reserve material set names of material sets for further secret management. Each namespace may be associated with (e.g., have, comprise) its own keyring associated with the key management service 104.

In embodiments, a client device 110 is configured to obtain a JavaScript Object Notation (JSON) Web Token (JWT) from the single sign-on service 108. The client device 110 may request for creating the material set name with the JWT. In response to the request, the client device 110 may receive a creation result from the secret management service 102.

The secret management service 102 may have a simple onboarding process. Compared to other secret management solutions, the users do not need to know or deal with any KMS domain terms or knowledge. Instead, the users only need to use the secret management user interface (UI) portal to create the material set, store the secrets inside the material set, and configure which PSMs are allowed to access the secrets. All of the KMS related operations, such as keyring, customer key management, data encryption and decryption, will be handled for the user by the secret management service 102 on the backend side. The users can retrieve secrets by choosing from several options based on their service environment, such as HTTP OpenAPI, SDK, Agent, Webhook and etc.

The secret management service 102 may be configured to perform secret rotation. Secret rotation may be used for scenarios with symmetric keys, such as advanced encryption standard (AES) keys. Symmetric keys may be keys that are utilized by both the server side and client side to finish authentication challenges. Additionally, or alternatively, symmetric keys may be leveraged to encrypt important data for exchange. The secret management service 102 may provide the functionality to generate these kinds of keys and rotate them periodically. In certain embodiments, the secret management service 102 may be utilized for basic authentication. Many applications and/or platforms maintain a set of user IDs and user secrets or application IDs and application secrets by themselves to fulfill basic authentication. This kind of secret storage and distribution can be totally handled by the secret management service 102. The secret section of basic authentication may be rotated periodically by the secret management service 102 to ensure secure communication between the server side and the client side.

In embodiments, secrets with secret-rotation enabled may each be associated with a duration (i.e., a "rotation duration"). For example, an AES key may have a rotation duration of 30 days. If an AES key has a rotation duration of 30 days, this may indicate that the key is set to be rotated every 30 days. If an AES key is set to be rotated every 30 days, then within the last 3 days of each 30-day window, a new AES key will be generated and returned to the caller together with the old key if a caller requests to retrieve the secret.

In embodiments, there may also be an active time stamp associated with or attached to the new AES key. As long as the time stamp is current, a software development kit (SDK) or agent may return the new AES key for service to use instead of the old one. When the time stamp is no longer current (e.g., 1 day after active time stamp), the old key may be marked as the historical version and may no longer be returned when a caller requests to retrieve the secret.

In embodiments, to address smooth rotation and prevent the time gap between machines, network time protocol (NTP) being out of sync, or customer side parsing errors (time zone differences) from happening, during the rotation duration, users of the secret management service 102 may be able retrieve both the new key and old key for a retry mechanism. This may be especially useful for high queries per second (QPS) services. However, outside the rotation duration, only one active key may be available upon secret retrieval.

In embodiments, because the secret rotation requires the admin JWT to retrieve client-side KMS data key to encrypt the new secrets and get them stored in the secret management service 102, the secret rotation triggering may not be automatic. Instead, it may require a manual trigger. For example, a notification prompt may instigate manual operation so that the secret management service 102 is able to acquire the admin JWT for the secret rotation operation, such as authN, audit and making key management service calls.

The secret management service 102 may be utilized to audit secret usage. For example, secret usage trails may be provided to users to audit the usage of the secrets. Such secret usage trails may provide convenience for the users to manage their secrets, to observe abnormal events, and/or to revoke long-term unused secrets. Additionally, such secret usage trails may provide tracing information for the users to see what current destinations are actually using secrets and/or to remove the unused destinations to reach the least privileged principle of security management.

In embodiments, a client device 110 is configured to create material set(s), manage secret information using material set name(s), and retrieve secret(s) using a dedicated OpenBSD application sub executor (doas) command. In some embodiments, a client device 110 is configured to retrieve secret(s) using a Mutual Transport Layer Security (MTLS) process. In other embodiments, a client device 110 is configured to retrieve secret(s) using any other suitable command or protocol.

Figure 2:
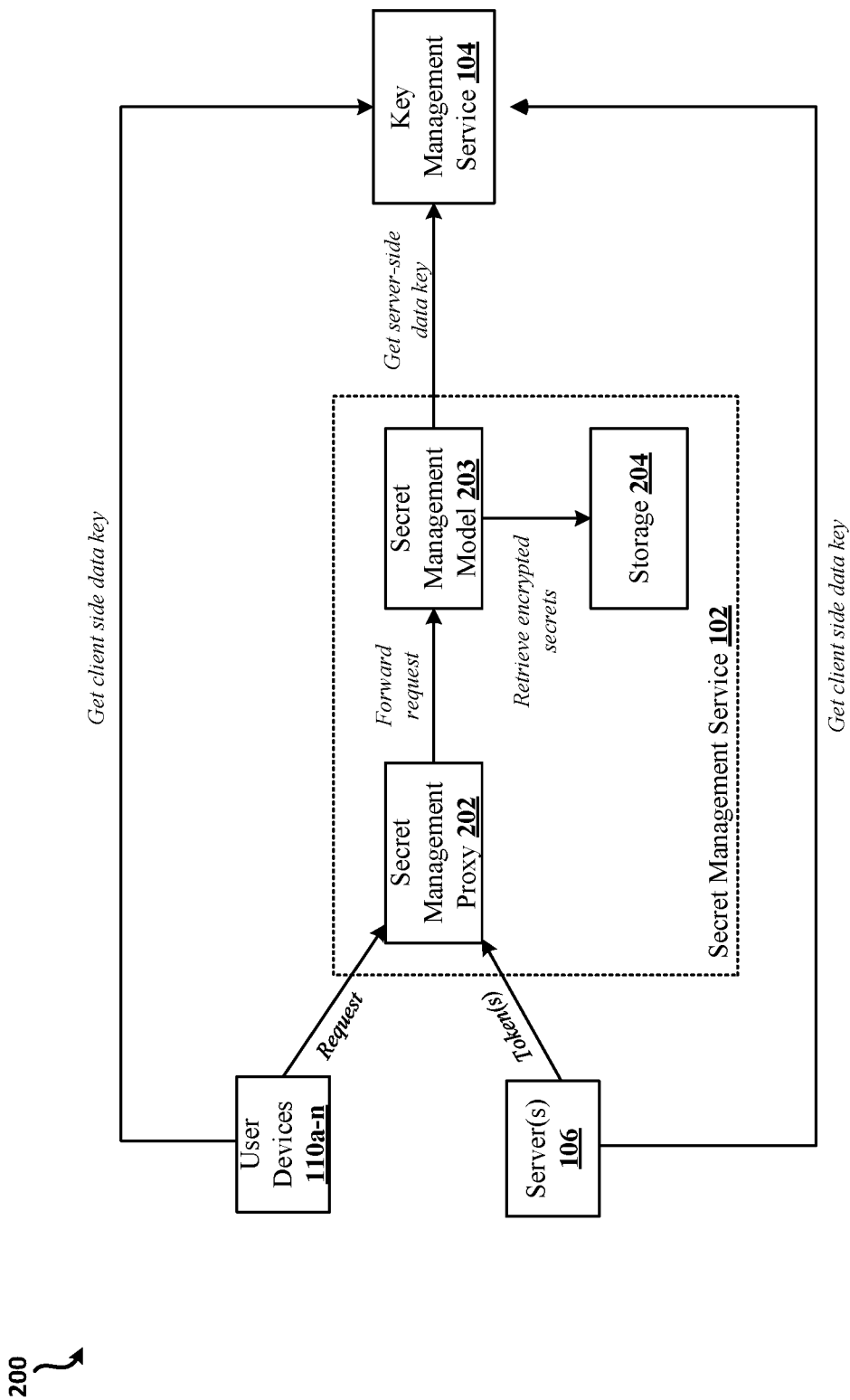
FIG. 2 shows an example architecture in accordance with the present disclosure.

FIG. 2 illustrates an example architecture 200 for the secret management service 102. The architecture 200 may be, for example, a data plane RPC architecture. The architecture 200 includes user devices 110a-n, server(s) 106, server-side components of the secret management service 102, and the key management service 104. The server-side components of the secret management service 102 include a secret management proxy 202, a secret management model 203, and storage 204. The secret management proxy 202 may be configured to handle authentication, request parsing from different callers (i.e., user devices 110a-n, and other caching functionalities. The storage 204 may be configured to store encrypted secrets. The storage 204 may be scalable and extensive to support many more queries per second, larger secret sizes, and different secret types.

A user device 110 may send a call (e.g., a request to retrieve a secret) to the secret management proxy 202. The user device 110 may also retrieve a client-side data key from the key management service 104. The server(s) 106 may send a token (e.g., GDPR token or ZTUmTLS token) associated with the user device 110 to the secret management proxy 202. The server(s) 106 may also retrieve the client-side data key from the key management service 104. The secret management proxy 202 may forward the request to the secret management model 203. In response, the secret management model 203 may also retrieve the server-side data key from the key management service 104. The secret management model 203 may then retrieve the encrypted secrets from the storage 204.

Figure 3:
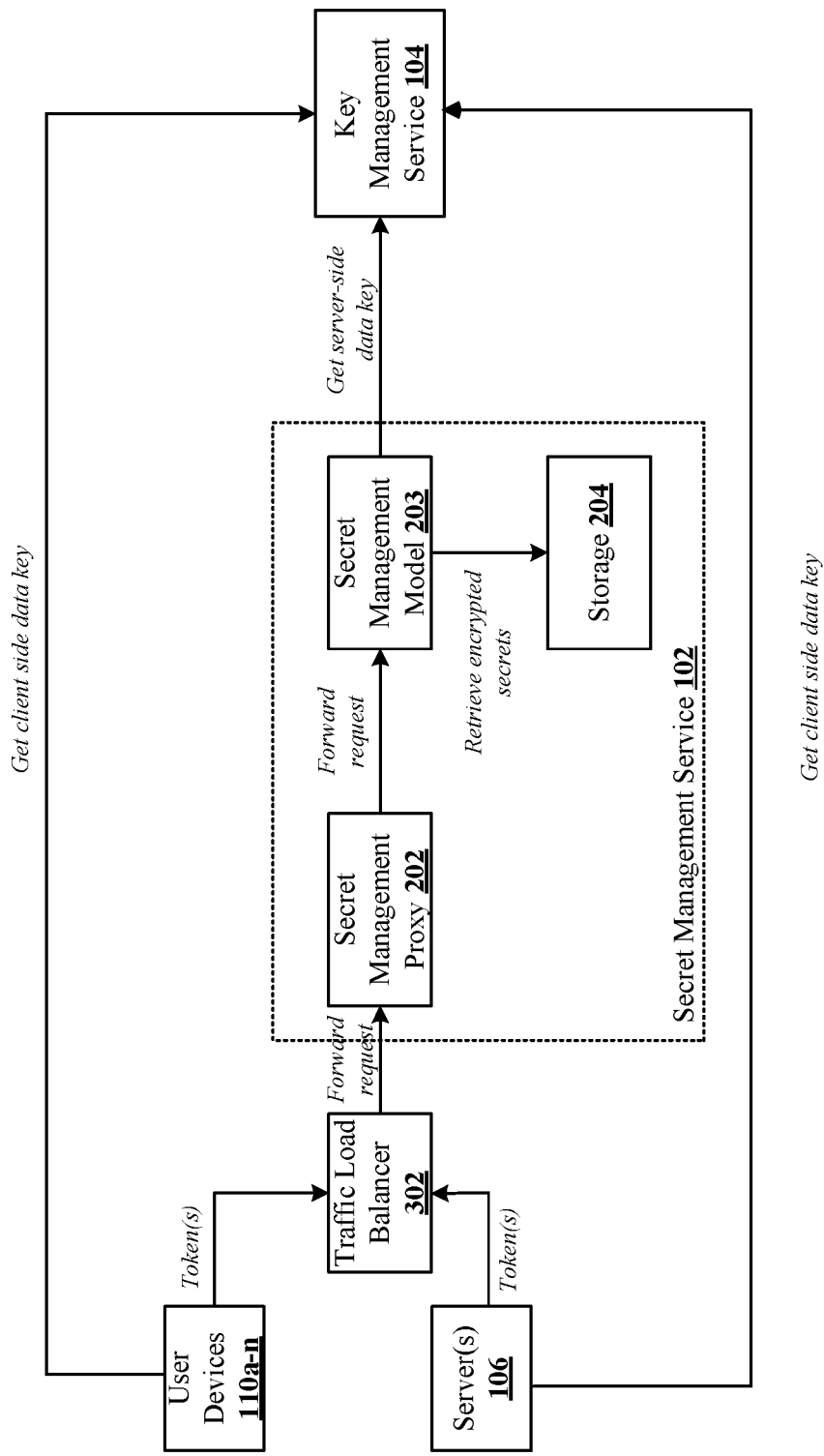
FIG. 3 shows another example architecture in accordance with the present disclosure.

FIG. 3 illustrates another example architecture 300 for the secret management service 102. The server-side architecture 300 may be, for example, a data plane HTTP architecture. The architecture 300 may be similar to the architecture 200. However, the architecture 300 may include a traffic load balancer (TLB) 302 positioned in between the user devices 110a-n and the secret management proxy 202 and between the server(s) 106 and the secret management proxy 202. The TLB 302 may be a device that acts as a reverse proxy and distributes network or application traffic across a number of servers. The TLB 302 may be utilized to increase capacity (concurrent users) and reliability of applications. The TLB 302 may receive a token (e.g., GDPR token or ZTUmTLS token) associated with the user device 110 from both the user device 110 and the server(s) 106. The TLB 302 may forward the request to the secret management proxy 202. The secret management proxy 202 may forward the request to the secret management model 203. In response, the secret management model 203 may retrieve the server-side data key from the key management service 104. The secret management model 203 may then retrieve the encrypted secrets from the storage 204.

Figure 4:
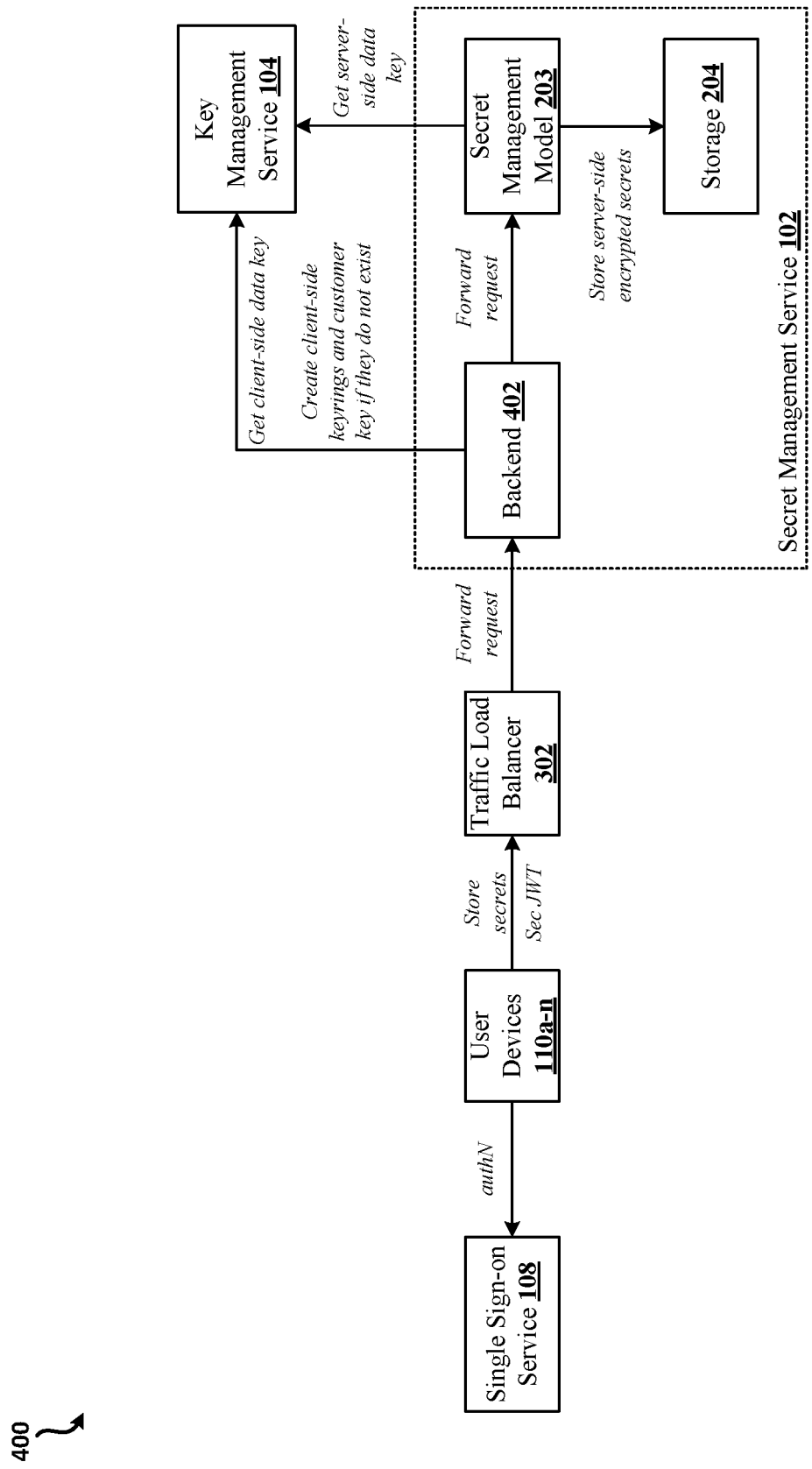
FIG. 4 shows another example architecture in accordance with the present disclosure.

FIG. 4 illustrates another example architecture 400 for the secret management service 102. The architecture 400 may be, for example, a control plane UI portal architecture. The architecture 400 includes the single sign-on service 108, user devices 110a-n, TLB 302, server-side components of the secret management service 102, and the key management service 104. The server-side components of the secret management service 102 include a backend 402, the secret management model 203, and storage 204. The backend 402 may be the backend for the frontend UI of the secret management service 102.

A user device 110 may be authenticated by the single sign-on service 108. The single sign-on service 108 may return a JWT for further access to the secret management service 102 and the key management service 104. The user device 110 may store secrets and forward the JWT to the TLB 302. The TLB 302 may forward the request to the backend 402. The backend 402 may forward the request to the secret management model 203 and get the client-side data key from the key management service 104. The backend 402 may additionally create the client-side keyrings and customer key if they are not available. The secret management model 203 may retrieve the server-side data key from the key management service 104. The secret management model 203 may store the encrypted secrets from the storage 204.

Figure 5:
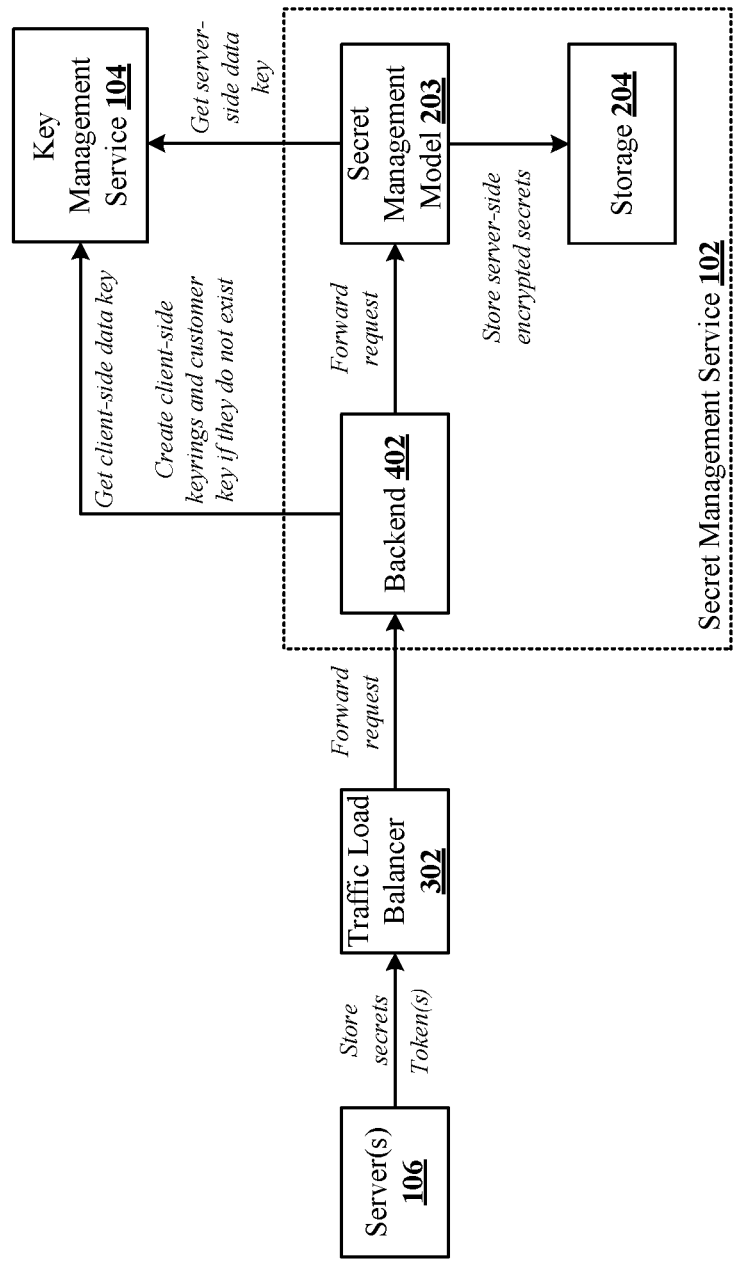
FIG. 5 shows another example architecture in accordance with the present disclosure.

FIG. 5 illustrates another example architecture 500 for the secret management service 102. The architecture 500 may be, for example, a control plane OpenAPI architecture. The architecture 500 includes the server(s) 106, TLB 302, server-side components of the secret management service 102, and the key management service 104. The server-side components of the secret management service 102 include the backend 402, the secret management model 203, and storage 204.

The server(s) 106 may store secrets and forward a token (e.g., GDPR token) to the TLB 302. The TLB 302 may forward the request to the backend 402. The backend 402 may forward the request to the secret management model 203 and get the client-side data key from the key management service 104. The backend 402 may additionally create the client-side keyrings and customer key if they are not available. The secret management model 203 may retrieve the server-side data key from the key management service 104. The secret management model 203 may store the encrypted secrets from the storage 204.

FIG. 6 shows an example architecture 600 for the secret management service 102. The architecture 600 may be, for example, a long polling agent architecture. The architecture 600 includes a business process 602, an agent process 604, the secret management proxy 202, and the key management service 104.

The agent process 604 may be launched by an SDK binary version and may be a wrapper of the SDK to expose an HTTP interface for retrieving secrets based on the Inter-Processor Control (IPC) of the loopback address. The agent process 604 may provide a language neutral experience for client-side development. The SDK for the secret management service 102 may be provided, for example, by the Golang library to handle secret cache and retrieval. The SDK for the secret management service 102 may include the SDK of the key management service 104 to handle the data key cache and retrieval. The SDK binary version may provide basic command line tools for retrieving secrets in a shell environment and may provide convenience for debugging and development.

The agent process 604 may pull down all the secrets, such as from the business process 604, that the current server 106 has permissions to access in the initialization stage. The agent process 604 may then periodically check the local cache and keep refreshing the secrets by long polling the metadata of the changed material sets instead of on demand retrieval. Some configurations of the secret storage may not require secret update or rotation in the service runtime. Long polling may be a better scale solution to handle different kinds of requirements. If there is a need for a high frequency of secret refreshments, Web Socket may be utilized.

FIG. 7 shows an example architecture 700 for the secret management service 102. The architecture 700 may be, for example, an agent Web Socket architecture. The architecture 700 includes a WebSocket Service 702. The WebSocket service 702 may be the Web Socket service of the secret management service 102. The Web Socket service 702 may be configured to push the metadata if in-time changed material sets to the corresponding agents.

Figure 8:
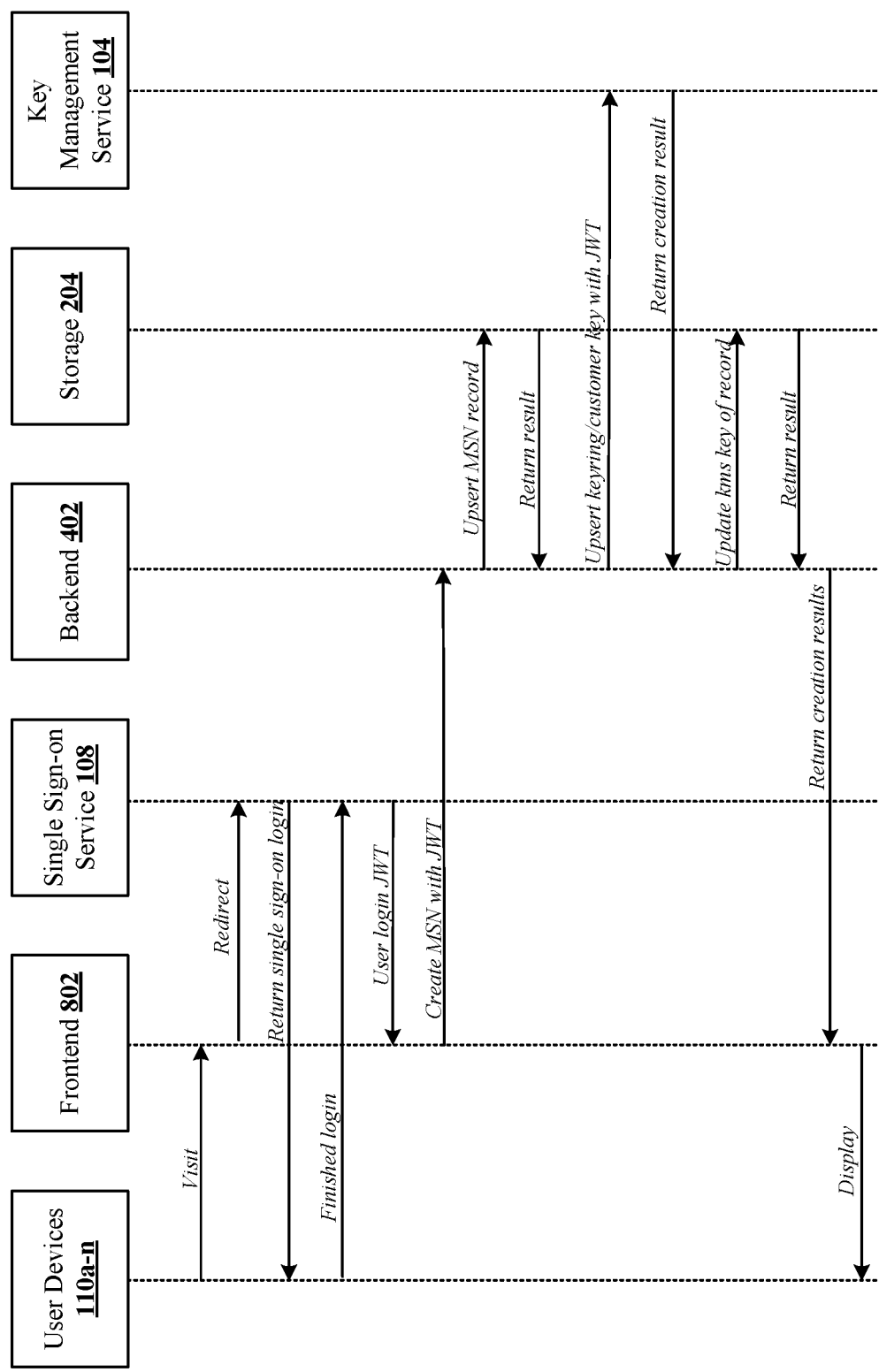
FIG. 8 shows an example diagram depicting creation of a namespace and/or a material set in accordance with the present disclosure.

FIG. 8 shows an example diagram 800 depicting creation of a namespace and/or a material set. A user device 110 may visit a frontend UI 802. The frontend UI 802 may redirect the user device 110 to the single sign-on service 108. In response, the single sign-on service 108 may return a single sign-on login to the user device 110. The user device 110 may complete login. After the user device 110 has completed the login, the single sign-on service may send, to the frontend UI 802, a user login JWT. The user may use the JWT to create a material set as well as a material set name (MSN) at the backend 402. The backend 402 may then upsert the material set name record and return the result to the backend 402. The backend 402 may then upsert the keyring and/or customer key in the key management service 104 using the JWT. The key management service 104 may return the creation result to the backend 402. The backend 402 may update the key management service 104 key of record in storage 204. Storage 204 may return the result to the backend 402. The backend 402 may then return the creation results to the frontend 802. The frontend 802 may display the results on an interface of the user device 110.

Figure 9:
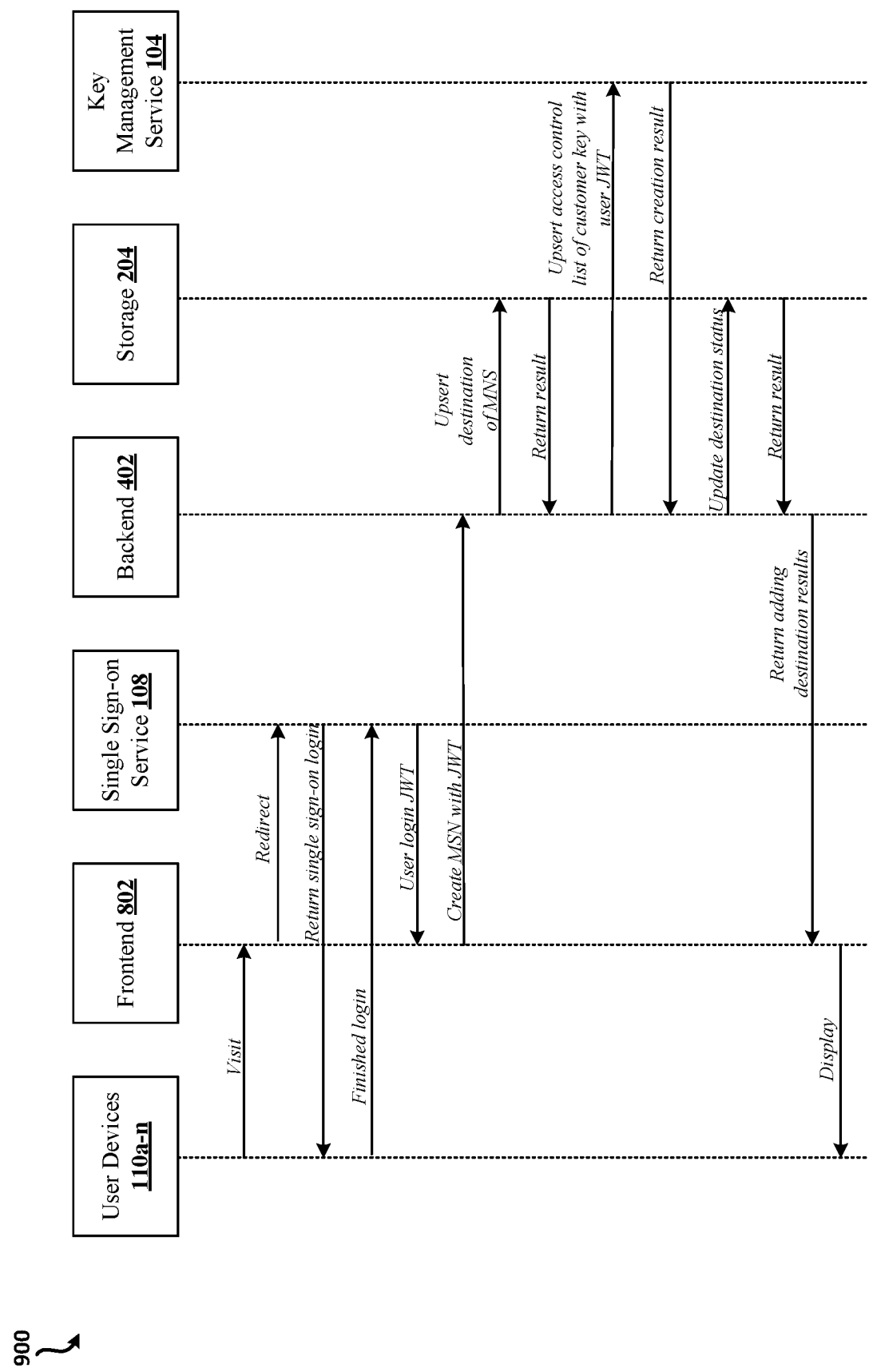
FIG. 9 shows an example diagram depicting the updating of a material set in accordance with the present disclosure.

FIG. 9 shows an example diagram 900 depicting the updating of a material set. A user device 110 may visit a frontend UI 802. The frontend UI 802 may redirect the user device 110 to the single sign-on service 108. In response, the single sign-on service 108 may return a single sign-on login to the user device 110. The user device 110 may complete login. After the user device 110 has completed the login, the single sign-on service may send, to the frontend UI 802, a user login JWT. The user may use the JWT to create and/or update a material setat the backend 402. The backend 402 may then upsert the destination of the material set and return the result to the backend 402. The backend 402 may then upsert the access control list of the customer key in the key management service 104 using the JWT. The key management service 104 may return the result to the backend 402. The backend 402 may update the destination status in storage 204. Storage 204 may return the result to the backend 402. The backend 402 may then return the added destination result to the frontend 802. The frontend 802 may display the results on an interface of the user device 110.

Figure 10:
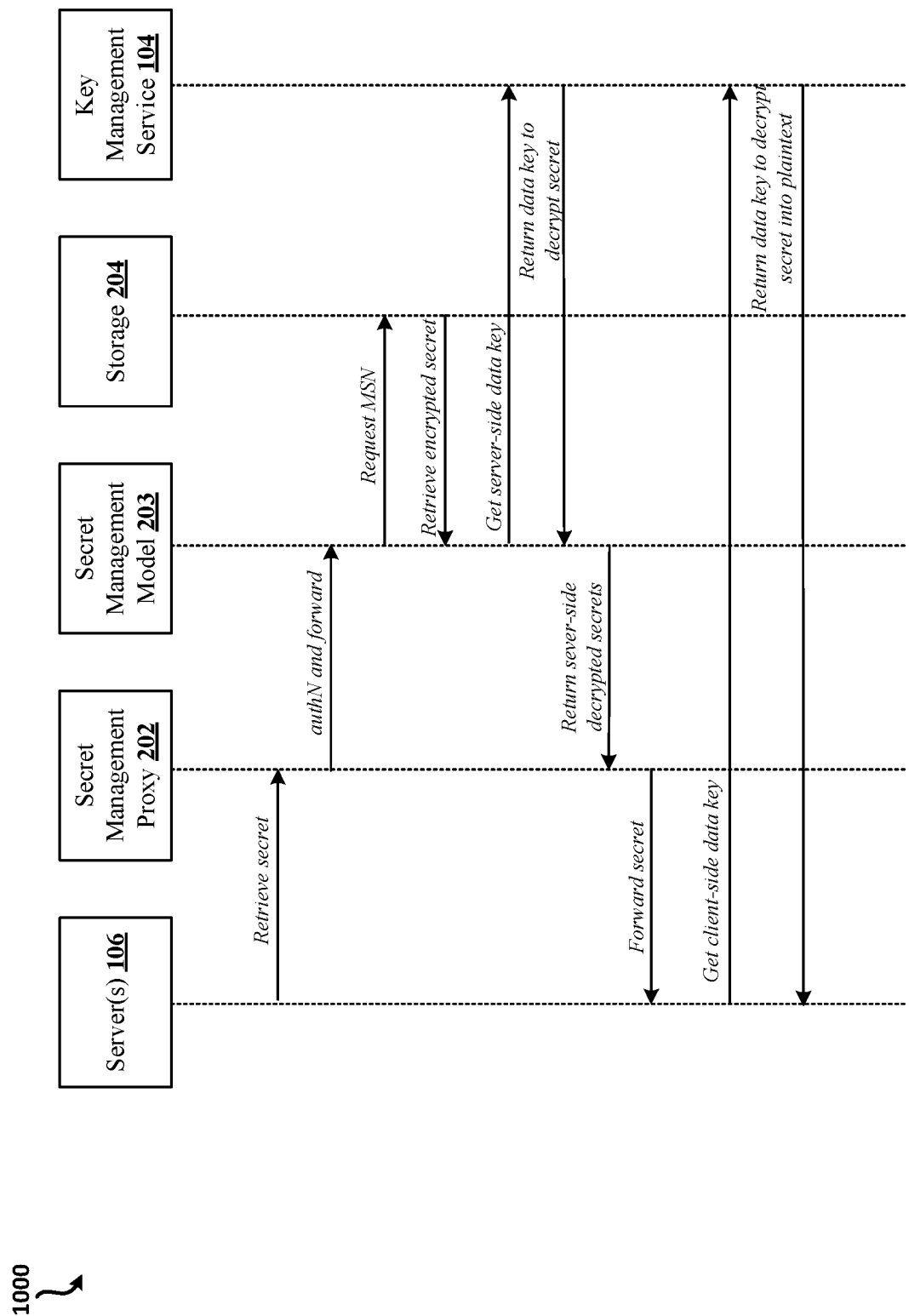
FIG. 10 shows an example diagram depicting retrieval of secrets in accordance with the present disclosure.

FIG. 10 shows an example diagram 1000 depicting the retrieval of secrets. The secret management proxy 202 may authenticate and forward a secret request to the secret management model 203. The secret management model 203 may request a material set from storage 204. The storage 204 may retrieve the encrypted secret and send it back to the secret management model 203. The secret management model 203 may then request the server-side data key from the key management service 104. The key management service 104 may return the data kay to decrypt the secret to the secret management model 203. The secret management model 203 may return the server-side decrypted secrets to the secret management proxy 202. The secret management proxy 202 may forward the secret to the server(s) 106. The sever(s) 106 may request the client-side data key from the key management service 104. In response, the key management service 104 may return the data key to decrypt the secret into plaintext.

In embodiments, retrieving secrets for devices (e.g., laptops, DevBoxes) may be accomplished using a similar workflow as described above. The only difference may be the authentication process. For server callers, secret management proxy 202 may authenticate them through the GDPR token attached within the request or mTLS. Either the GDPR token or the ZTUmTLS token has been placed in when the server is bootstrapped. For DevBox callers, users can use doas commands to retrieve the secrets through a specific PSM identity that has permissions to access the secret. DevBox callers may alternatively use mTLS to finish the authentication process instead.

Figure 11:
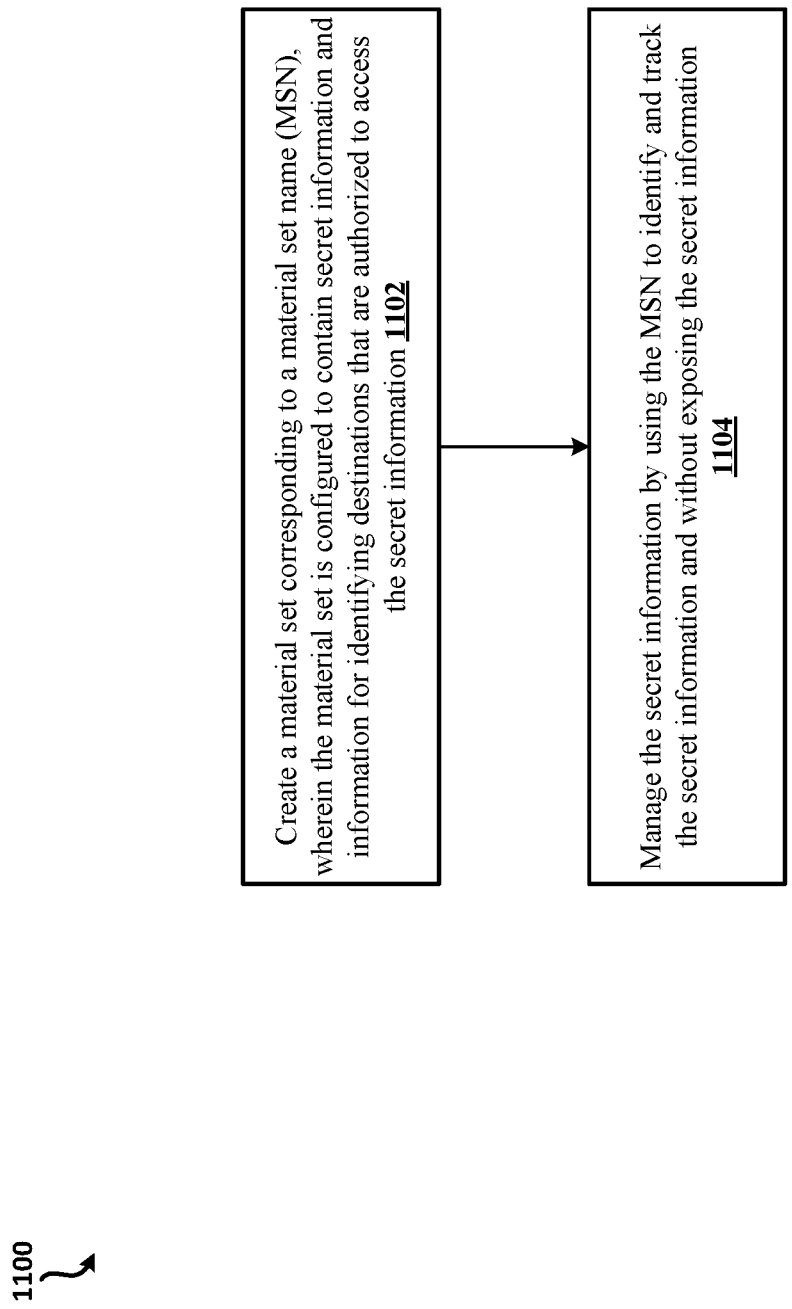
FIG. 11 shows an example process for secret management in accordance with the present disclosure.

FIG. 11 illustrates an example process 1100 that may be performed by the client device (e.g., client device 110). The client device 110 may perform the process 1100 for secret information management. Although depicted as a sequence of operations in FIG. 11, those of ordinary skill in the art will appreciate that various embodiments may add, remove, reorder, or modify the depicted operations.

As discussed above, the secret management service 102 may utilize a material set that plays the role of a reference key. The reference key may pass secrets across different applications and platforms. At 1102, a material set may be created. The material set may be configured to contain secret information. The material set may have its own data key associated with the key management service 104 for end-to-end secret encryption and/or decryption. Each material set may contain a list of one or more items of secret information, including all the historical versions of each item of secret information in the list. For example, a material set may include up to twenty historical versions of each secret in a list. However, only one of these versions will be set to be active and able to be retrieved. The material set may contain information for identifying destinations that are authorized to access the secret information. For example, the material set may include a list of destination these secrets are allowed to be retrieved from. Each material set may be allowed to store one of the following types of secrets: username and password, public key and private key, secret string (e.g., AES key, token), or any other type of secret.

The material set may correspond to a material set name. The secret information may be identified and tracked by material set name. The material set name may be expressed in a URL Format of one level URI, to be hierarchical for the management of namespaces and material sets. At 1104, the secret information may be managed by using the material set name to identify and track the secret information without exposing the secret information. Instead of displaying the secret information on a user interface and letting users copy, paste, and configure them, the secret management service 102 may cause the display of only the material set name with proper ownership setup. Users of the secret management service 102 just need to add their service(s) privileged session managers (PSMs) into the destination section, then their service(s) may be able to retrieve and use the secret information in the bootstrapping stage and runtime.

Figure 12:
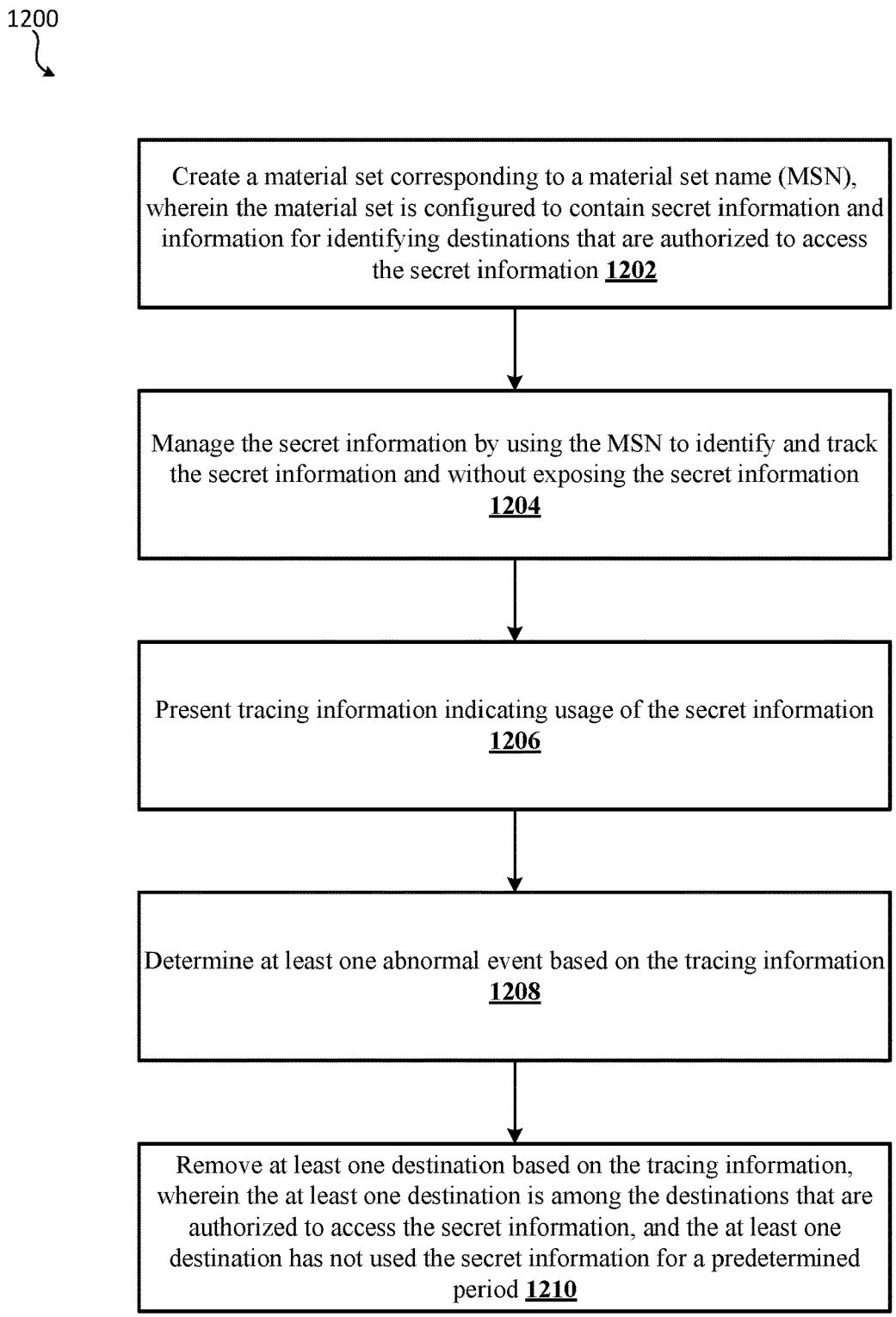
FIG. 12 shows another example process for managing secret information in accordance with the present disclosure.

FIG. 12 illustrates an example process 1200 that may be performed by the client device (e.g., client device 110). The client device 110 may perform the process 1200 for secret information management. Although depicted as a sequence of operations in FIG. 12, those of ordinary skill in the art will appreciate that various embodiments may add, remove, reorder, or modify the depicted operations.

As discussed above, the secret management service 102 may utilize a material set that plays the role of a reference key. The reference key may pass secrets across different applications and platforms. At 1202, a material set may be created. The material set may be configured to contain secret information. The material set may have its own data key associated with the key management service 104 for end-to-end secret encryption and/or decryption. Each material set may contain a list of one or more items of secret information, including all the historical versions of each item of secret information in the list. For example, a material set may include up to twenty historical versions of each secret in a list. However, only one of these versions will be set to be active and able to be retrieved. The material set may contain information for identifying destinations that are authorized to access the secret information. For example, the material set may include a list of destination these secrets are allowed to be retrieved from. Each material set may be allowed to store one of the following types of secrets: username and password, public key and private key, secret string (e.g., AES key, token), or any other type of secret.

The material set may correspond to a material set name. The secret information may be identified and tracked by material set name. The material set name may be expressed in a URL Format of one level URI, to be hierarchical for the management of namespaces and material sets. At 1204, the secret information may be managed by using the material set name to identify and track the secret information without exposing the secret information. Instead of displaying the secret information on a user interface and letting users copy, paste, and configure them, the secret management service 102 may cause the display of only the material set name with proper ownership setup. Users of the secret management service 102 just need to add their service(s) privileged session managers (PSMs) into the destination section, then their service(s) may be able to retrieve and use the secret information in the bootstrapping stage and runtime.

At 1206, tracing information indicating usage of the secret information may be presented. For example, secret usage trails may be displayed. Such secret usage trails may be utilized to audit the usage of the secrets. Such secret usage trails may provide convenience for the users of the secret management service 102 to manage their secrets, to observe abnormal events, and/or to revoke long-term unused secrets. At 1208, at least one abnormal event may be determined based on the tracing information. Additionally, such secret usage trails may provide tracing information for the users of the secret management service 102 to see what current destinations are actually using secrets and/or to remove the unused destinations to reach the least privileged principle of security management. At 1210, at least one destination may be removed based on the tracing information. The at least one destination may be among the destinations that are authorized to access the secret information, and the at least one destination may not have used the secret information for a predetermined period.

Figure 13:
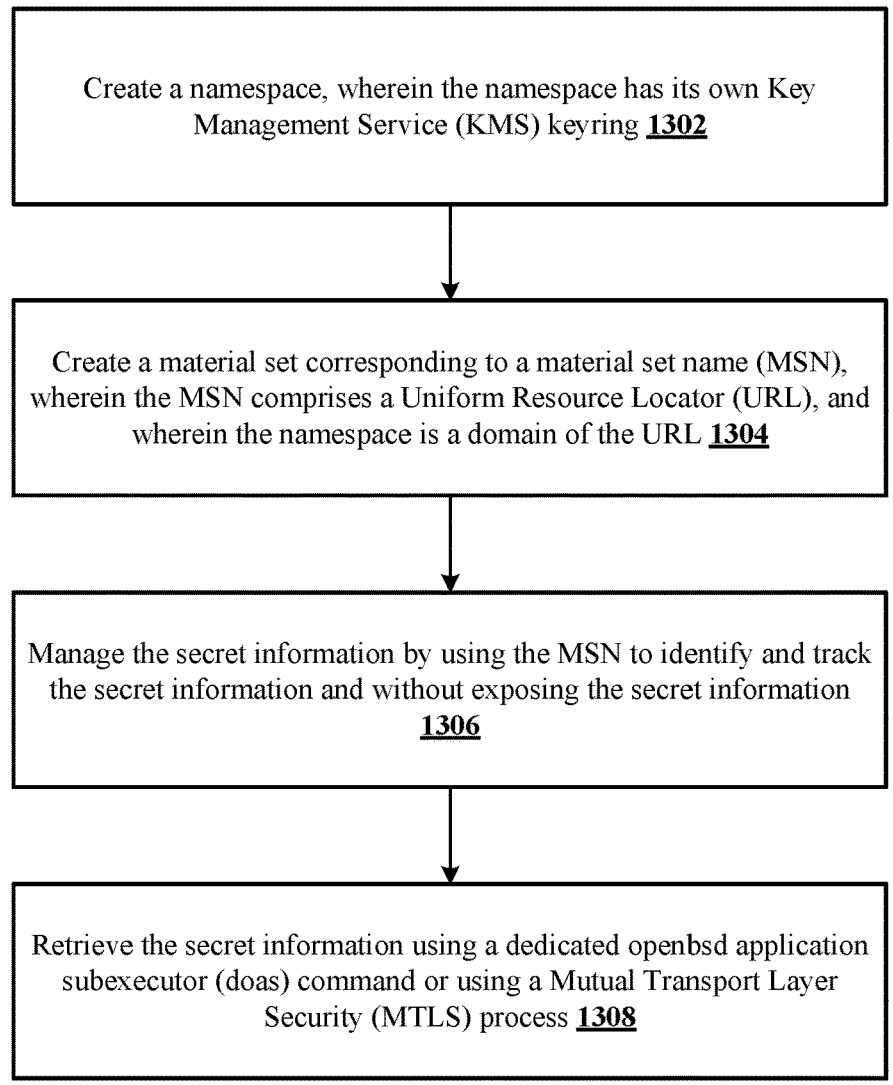
FIG. 13 shows another example process for managing secret information in accordance with the present disclosure.

FIG. 13 illustrates an example process 1300 that may be performed by the client device (e.g., client device 110). The client device 110 may perform the process 1300 for secret information management. Although depicted as a sequence of operations in FIG. 13, those of ordinary skill in the art will appreciate that various embodiments may add, remove, reorder, or modify the depicted operations.

A material set may belong to or be associated with a namespace. A namespace associated with a particular material set may be the domain of the URL associated with that particular material set name. At 1302, a namespace may be created. The namespace may have its own key management service keyring. Users of the secret management service 102 can create their own namespaces for their specific services or purposes in order to reserve material set names of material sets for further secret management.

A material set may correspond to a material set name. Secrets may be identified and tracked by material set name. At 1304, a material set corresponding to a material set name may be created. The material set name may be expressed in a URL Format of one level URI, to be hierarchical for the management of namespaces and material sets. The namespace may be a domain of the URL.

At 1306, the secret information may be managed by using the material set name to identify and track the secret information without exposing the secret information. Instead of displaying the secret information on a user interface and letting users copy, paste, and configure them, the secret management service 102 may cause the display of only the material set name with proper ownership setup. Users of the secret management service 102 just need to add their service(s) privileged session managers (PSMs) into the destination section, then their service(s) may be able to retrieve and use the secret information in the bootstrapping stage and runtime. At 1308, the secret information may be retrieved using a dedicated OpenBSD application subexecutor (doas) command or using a Mutual Transport Layer Security (MTLS) process.

Figure 14:
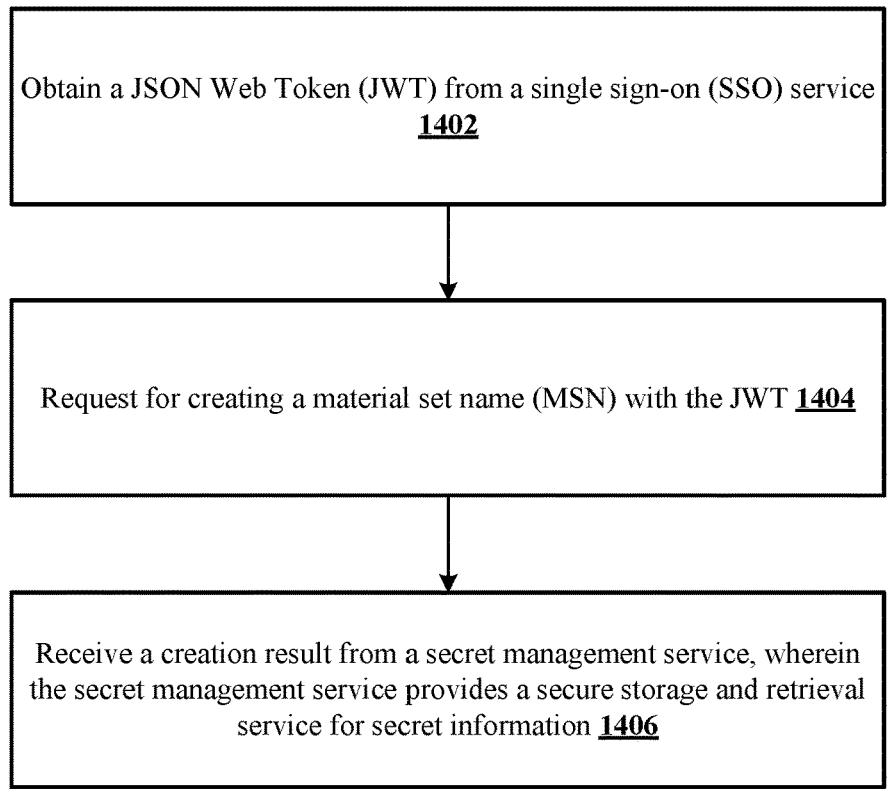
FIG. 14 shows another example process for managing secret information in accordance with the present disclosure.

FIG. 14 illustrates an example process 1400 that may be performed by the client device (e.g., client device 110). The client device 110 may perform the process 1400 for secret information management. Although depicted as a sequence of operations in FIG. 14, those of ordinary skill in the art will appreciate that various embodiments may add, remove, reorder, or modify the depicted operations.

At 1402, a JWY may be obtained from a single sign on service. For example, a client device 110 may obtain a JWT from the single sign-on service 108. The client device 110 may request for creating a material set name with the JWT. At 1404, it may be requested that a material set name be created using the JWT. At 1406, a creation result may be received from a secret management service. The secret management service may provide a secure storage and retrieval service for secret information. For example, in response to the request, the client device 110 may receive a creation result from the secret management service 102.

Figure 15:
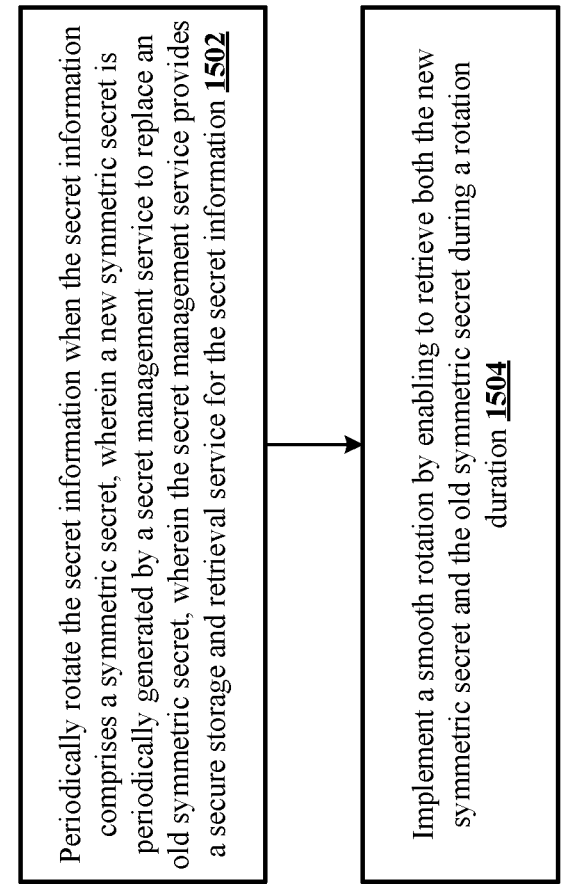
FIG. 15 shows another example process for managing secret information in accordance with the present disclosure.

FIG. 15 illustrates an example process 1500 to perform secret rotation. Although depicted as a sequence of operations in FIG. 15, those of ordinary skill in the art will appreciate that various embodiments may add, remove, reorder, or modify the depicted operations.

The secret management service 102 may be configured to perform secret rotation on both the server-side and the client-side. Secret rotation may be used for scenarios with symmetric keys, such as advanced encryption standard (AES) keys. Symmetric keys may be keys that are utilized by both the server side and client side to finish authentication challenges. Additionally, or alternatively, symmetric keys may be leveraged to encrypt important data for exchange. The secret management service 102 may provide the functionality to generate these kinds of keys and rotate them periodically. At 1502, secret information may be periodically rotated when the secret information comprises a symmetric secret. A new symmetric secret may be periodically generated by a secret management service to replace an old symmetric secret. The secret management service may provide a secure storage and retrieval service for the secret information Secrets with secret-rotation enabled may each be associated with a duration (i.e., a "rotation duration"). For example, an AES key may have a rotation duration of 30 days. If an AES key has a rotation duration of 30 days, this may indicate that the key is set to be rotated every 30 days. If an AES key is set to be rotated every 30 days, then within the last 3 days of each 30-day window, a new AES key will be generated and returned to the caller together with the old key if a caller requests to retrieve the secret.

There may be an active time stamp associated with or attached to the new AES key. As long as the time stamp is current, a software development kit (SDK) or agent may return the new AES key for service to use instead of the old one. When the time stamp is no longer current (e.g., 1 day after active time stamp), the old key may be marked as the historical version and may no longer be returned when a caller requests to retrieve the secret.

At 1504, a smooth rotation may be implemented by enabling the retrieval of both the new symmetric secret and the old symmetric secret during a rotation duration. For example, to address smooth rotation and prevent the time gap between machines, network time protocol (NTP) being out of sync, or customer side parsing errors (time zone differences) from happening, during the rotation duration, users of the secret management service 102 may be able retrieve both the new key and old key for a retry mechanism. This may be especially useful for high queries per second (QPS) services. However, outside the rotation duration, only one active key may be available upon secret retrieval.

Figure 16:
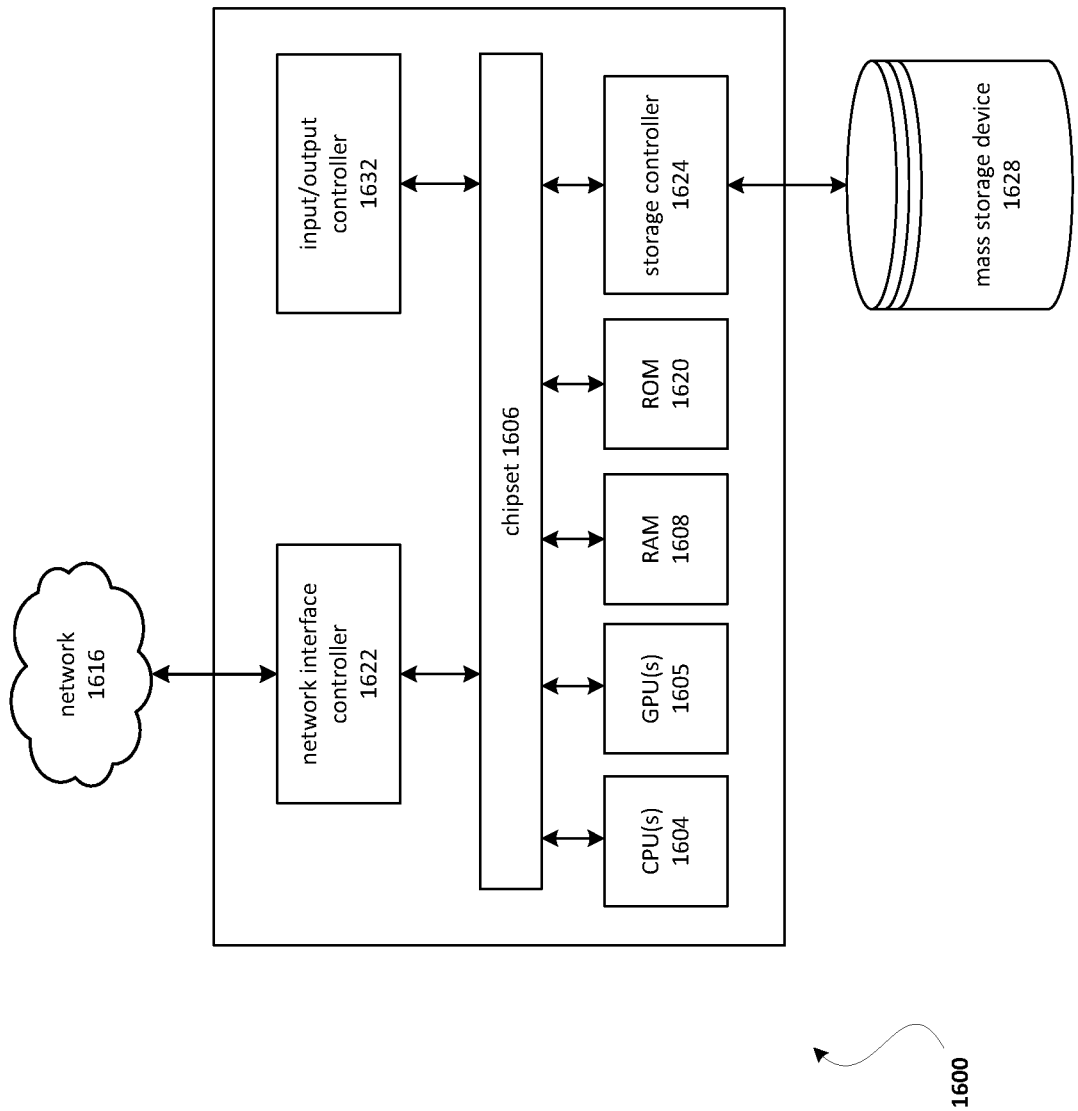
FIG. 16 shows an example computing device which may be used to perform any of the techniques disclosed herein.

FIG. 16 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1600 of FIG. 16. The computer architecture shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1604 may be augmented with or replaced by other processing units, such as GPU(s). The GPU(s) may comprise processing units specialized for but not necessarily limited to highly parallel computations, such as graphics and other visualization-related processing.

A chipset 1606 may provide an interface between the CPU(s) 1604 and the remainder of the components and devices on the baseboard. The chipset 1606 may provide an interface to a random-access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN). The chipset 1606 may include functionality for providing network connectivity through a network interface controller (NIC) 1622, such as a gigabit Ethernet adapter. A NIC 1622 may be capable of connecting the computing device 1600 to other computing nodes over a network 1616. It should be appreciated that multiple NICs 1622 may be present in the computing device 1600, connecting the computing device to other types of networks and remote computer systems.

The computing device 1600 may be connected to a mass storage device 1628 that provides non-volatile storage for the computer. The mass storage device 1628 may store system programs, application programs, other program modules, and data, which have been described in greater detail herein. The mass storage device 1628 may be connected to the computing device 1600 through a storage controller 1624 connected to the chipset 1606. The mass storage device 1628 may consist of one or more physical storage units. The mass storage device 1628 may comprise a management component 1610. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on the mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of managing secret information, comprising:
creating a material set corresponding to a material set name (MSN), wherein the material set is configured to contain secret information and information for identifying destinations that are authorized to access the secret information;
managing the secret information by using the MSN to identify and track the secret information and without exposing the secret information;
periodically rotating the secret information when the secret information comprises a symmetric secret, wherein a new symmetric secret is periodically generated by a secret management service to replace an old symmetric secret, wherein the secret management service provides a secure storage and retrieval service for the secret information; and
implementing a smooth rotation by enabling to retrieve both the new symmetric secret and the old symmetric secret during a rotation duration.

2. The method of claim 1, further comprising:
presenting tracing information indicating usage of the secret information.

3. The method of claim 2, further comprising:
determining at least one abnormal event based on the tracing information, or
removing at least one destination based on the tracing information, wherein the at least one destination is among the destinations that are authorized to access the secret information, and the at least one destination has not used the secret information for a predetermined period.

4. The method of claim 1, further comprising:
creating a namespace, wherein the namespace has its own Key Management Service (KMS) keyring, wherein the MSN comprises a Uniform Resource Locator (URL), and wherein the namespace is a domain of the URL.

5. The method of claim 1, wherein the material set has its own KMS data key for end-to-end secret encryption or decryption.

6. The method of claim 1, wherein the secret information comprises at least one type of secrets comprising usernames, passwords, public keys, private keys, or secret strings.

7. The method of claim 1, further comprising:
obtaining a JSON Web Token (JWT) from a single sign-on (SSO) service;
request for creating the MSN with the JWT; and
receiving a creation result from a secret management service, wherein the secret management service provides a secure storage and retrieval service for the secret information.

8. The method of claim 1, further comprising:
retrieving the secret information using a dedicated openbsd application subexecutor (doas) command or using a Mutual Transport Layer Security (MTLS) process.

9. The method of claim 1,
wherein the new symmetric secret is associated with an active time stamp; and
wherein after the active time stamp, the old symmetric secret is replaced by the new symmetric secret, only the new symmetric secret is retrieved, and the old symmetric secret is marked as a historical version.

10. A system, comprising:
at least one processor in communication with at least one memory, the at least one memory comprising computer-readable instructions that upon execution by the at least one processor configure the system to perform operations comprising:
creating a material set corresponding to a material set name (MSN), wherein the material set is configured to contain secret information and information for identifying destinations that are authorized to access the secret information;
managing the secret information by using the MSN to identify and track the secret information and without exposing the secret information;
periodically rotating the secret information when the secret information comprises a symmetric secret, wherein a new symmetric secret is periodically generated by a secret management service to replace an old symmetric secret, wherein the secret management service provides a secure storage and retrieval service for the secret information; and
implementing a smooth rotation by enabling to retrieve both the new symmetric secret and the old symmetric secret during a rotation duration.

11. The system of claim 10, the operations further comprising:
presenting tracing information indicating usage of the secret information; and
determining at least one abnormal event based on the tracing information, or removing at least one destination based on the tracing information, wherein the at least one destination is among the destinations that are authorized to access the secret information, and the at least one destination has not used the secret information for a predetermined period.

12. The system of claim 10, the operations further comprising:
creating a namespace, wherein the namespace has its own Key Management Service (KMS) keyring, wherein the MSN comprises a Uniform Resource Locator (URL), and wherein the namespace is a domain of the URL.

13. The system of claim 10, the operations further comprising:
obtaining a JSON Web Token (JWT) from a single sign-on (SSO) service;
request for creating the MSN with the JWT; and
receiving a creation result from a secret management service, wherein the secret management service provides a secure storage and retrieval service for the secret information.

14. A non-transitory computer-readable storage medium, storing computer-readable instructions that upon execution by a processor cause the processor to implement operations comprising:
creating a material set corresponding to a material set name (MSN), wherein the material set is configured to contain secret information and information for identifying destinations that are authorized to access the secret information;
managing the secret information by using the MSN to identify and track the secret information and without exposing the secret information;
periodically rotating the secret information when the secret information comprises a symmetric secret, wherein a new symmetric secret is periodically generated by a secret management service to replace an old symmetric secret, wherein the secret management service provides a secure storage and retrieval service for the secret information; and implementing a smooth rotation by enabling to retrieve both the new symmetric secret and the old symmetric secret during a rotation duration.

15. The non-transitory computer-readable storage medium of claim 14, the operations further comprising:

presenting tracing information indicating usage of the secret information; and determining at least one abnormal event based on the tracing information, or removing at least one destination based on the tracing information, wherein the at least one destination is among the destinations that are authorized to access the secret information, and the at least one destination has not used the secret information for a predetermined period.

16. The non-transitory computer-readable storage medium of claim 14, the operations further comprising:

creating a namespace, wherein the namespace has its own Key Management Service (KMS) keyring, wherein the MSN comprises a Uniform Resource Locator (URL), and wherein the namespace is a domain of the URL.

* * * * *